Aug. 27, 1946.  C. DORSMAN  2,406,492
DEVICE FOR MEASURING LOW DIRECT VOLTAGES
Filed Dec. 30, 1942
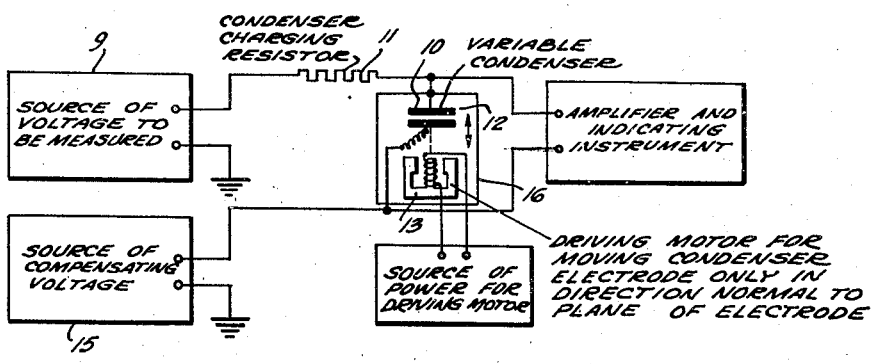
Inventor:
CORNELIS DORSMAN
By Alm Holcombe
Attorney.

Patented Aug. 27, 1946

2,406,492

UNITED STATES PATENT OFFICE 2,406,492

DEVICE FOR MEASURING LOW DIRECT VOLTAGES

Cornelis Dorsman, Eindhoven, Netherlands; vested in the Alien Property Custodian Application December 30, 1942, Serial No 470,685
In the Netherlands January 6, 1941

5 Claims. (Cl. 171—95)

For measuring small direct voltages, and more particularly for measuring the terminal voltage of a source of direct current having a very high internal resistance, devices have come to be known in which the direct voltage to be measured is converted into alternating voltage by means of a condenser which is charged by the direct voltage to be measured, means being provided by which the condenser capacity is periodically altered. From the condenser an alternating voltage may then be taken whose amplitude is proportional to the value of the direct valtage supplied thereto, which alternating voltage, after having been amplified and, if desired, rectified can be measured in a simple manner. Such devices may also be used with advantage for determining the value of direct voltages by means of a compensation method, in which the obtained accuracy depends on the accuracy with which the difference in value of the unknown direct voltage and a known direct voltage can be measured.

We have found that the accuracy with which a direct voltage can be measured by means of the devices referred to above is comparatively small, since it generally amounts only to about 0.020 volt.

The invention provides an improvement of devices of the kind referred to above, thus reaching a much greater accuracy in measuring.

According to the invention the electrodes of the condenser, which is loaded by the direct voltage to be measured, are flat and parallel and so arranged as to be movable with respect to one another solely in a direction normal to the plane of the electrodes by the said means for periodically varying the condenser capacity.

The invention is based on the realisation that the said small measuring accuracy is due to the difference in contact potential of the two condenser electrodes, owing to which the condenser will always exhibit a definite charge even if no charge is supplied to it. Since the contact potential of a metal surface is different from point to point the difference in contact potential between the electrodes, which is approximately independent on the distance between the electrodes, will be constant only if upon varying the condenser capacity by relative displacement of the electrodes the active electrode surface remains always the same and, moreover, the ratio between the contribution towards the total condenser capacity delivered by any part of the active electrode surface and the total condenser capacity always remains the same which is ensured, according to the invention, by taking the steps referred to above.

In order to achieve that the difference in contact potential does not alter eventually it has proved advantageous to house the condenser in hermetically closed envelope and a chemically inert atmosphere, preferably in a vacuum, thus avoiding alterations of the contact potential by atmospheric and/or chemical agency.

By the said expedients it is achieved that the difference in contact potential of the electrodes is constant in contradistinction to that of the known devices. Thus the value and polarity of the contact potential can be determined and when these factors are taken into consideration in making measuremets a much greater measuring accuracy is obtained than is feasible by means of known devices.

In order that the requirements imposed on the accuracy of the mechanical structure of the condenser, in conjunction with the desired measuring accuracy, shall be as small as possible it is advisable that the electrodes of the condenser should be made from a metal having such properties that the difference in contact potential of two electrodes made therefrom is naturally very low. In this respect it has proved advantageous to make the electrodes from electrolytic red copper.

Since by the above steps the difference in contact potential of the condenser electrodes is constant, at variance with that of known devices comprising variable condensers, for instance by rotation of one of the electrodes, the difference in contact potential of the electrodes can be made up for, according to the invention, by supplying to the condenser a constant direct voltage which is equal but opposite to the difference in contact potential of the condenser electrodes. This may be made with advantage more particularly in making measurements according to the compensation method. In this method the unknown direct voltage and a known direct voltage for comparison are assumed exactly equal, if no alternating voltage at all is set up at the condenser having a variable capacity to which is supplied the difference of the two direct voltages, which can be readily ascertained by means of sensitive amplifying devices controlling a voltmeter or ammeter of the usual type or an indicating device such as a cathode-ray indicator, so that a very great measuring accuracy can be obtained.

The invention will be further described with reference to the appended drawing the single figure of which illustrates one form of a voltage measuring device embodying the invention.

As shown in the drawing the voltage to be measured 9 is applied to a variable capacitance condenser 10 through a charging resistor 11. Condenser 10 consists of two flat and parallel electrode plates 12 one of which is fixed and the other of which is capable of movement solely in a direction normal to the plane of the electrode plates. For moving the said movable electrode plate and thereby varying the capacitance of the condenser there is provided a motor unit 13 having preferably a construction similar to the well-known structure used for a loudspeaker, said motor unit being energized by a suitable source of alternating current.

The condenser 10 and the driving motor 13 are enclosed within a hermetically-sealed container 16 which may be evacuated or filled with a chemically-inert atmosphere.

The alternating voltage produced across condenser 10 during the periodic varying of the capacitance thereof is amplified and subsequently operates a suitable indicating instrument, such as a voltmeter, ammeter or a cathode-ray tube.

For compensating the contact potential of the condenser electrodes there is provided a source of compensating voltage 15 the polarity and intensity of which is adjustable to produce the desired cancellation.

What I claim is:

1. Apparatus for measuring a direct voltage comprising, a variable condenser member comprising two flat parallel electrodes spaced apart and movable with respect to each other solely in a direction normal to the planes of the electrodes, means to apply the direct voltage to be measured to the said condenser-electrodes, means to periodically move one electrode relative to the other electrode solely in a direction normal to the planes of the electrodes and through a substantially constant displacement value to thereby vary the spacing between the electrodes and the capacitance of the condenser between substantially fixed limits, and means to measure the pulsating voltage produced at the terminals of the condenser by the variation in the capacity thereof.

2. Apparatus for measuring a direct voltage comprising, a variable condenser member comprising two flat parallel electrodes spaced apart and movable with respect to each other solely in a direction normal to the planes of the electrodes, an hermetically sealed envelope enclosing said electrodes and a chemically inert atmosphere filling said envelope, means to apply the direct voltage to be measured to the said condenser electrodes, means to periodically move one electrode relative to the other electrode solely in a direction normal to the planes of the electrodes and through a substantially constant displacement value to thereby vary the spacing between the electrodes and the capacitance of the condenser between substantially fixed limits, and means to measure the pulsating voltage produced at the terminals of the condenser by the variation in the capacity thereof.

3. Apparatus for measuring a direct voltage comprising, a variable condenser member comprising two flat parallel electrodes spaced apart and movable with respect to each other solely in a direction normal to the planes of the electrodes and an evacuated hermetically sealed envelope enclosing said electrodes, means to apply the direct voltage to be measured to the said condenser electrodes, means to periodically move one electrode relative to the other electrode solely in a direction normal to the planes of the electrodes and through a substantially constant displacement value to thereby vary the spacing between the electrodes and the capacitance of the condenser between substantially fixed limits, and means to measure the pulsating voltage produced at the terminals of the condenser by the variation in the capacity thereof.

4. Apparatus for measuring a direct voltage comprising, a variable condenser member comprising two flat parallel electrodes consisting of electrolytic red copper and being spaced apart and movable with respect to each other solely in a direction normal to the plane of the electrodes, means to apply the direct voltage to be measured to the said condenser electrodes, means to periodically move one electrode relative to the other electrode solely in a direction normal to the planes of the electrodes and through a substantially constant displacement value to thereby vary the spacing between the electrodes and the capacitance of the condenser between substantially fixed limits, and means to measure the pulsating voltage produced at the terminals of the condenser by the variation in the capacity thereof.

5. Apparatus for measuring a direct voltage comprising, a variable condenser member comprising two flat parallel electrodes spaced apart and movable with respect to each other solely in a direction normal to the planes of the electrodes, means to apply the direct voltage to be measured to the said condenser electrode, means to periodically move one electrode relative to the other electrode solely in a direction normal to the planes of the electrodes and through a substantially constant displacement value to thereby vary the spacing between the electrodes and the capacitance of the condenser between substantially fixed limits, means to cancel the inherent differential contact potential of the electrodes comprising a source of constant direct voltage connected to said electrodes and having a value equal and opposite to the difference in contact potential of the condenser electrodes, and means to measure the pulsating voltage produced at the terminals of the condenser by the variation in the capacity thereof.

CORNELIS DORSMAN.